United States Patent [19]

Cerny et al.

[11] Patent Number: 4,574,067
[45] Date of Patent: Mar. 4, 1986

[54] CROSSHEAD WITH STATIC MIXERS

[75] Inventors: Daryl D. Cerny, Greenville, Ohio; Edwin J. Diebolt, Muncie, Ind.

[73] Assignee: Ball Corporation, Muncie, Ind.

[21] Appl. No.: 707,721

[22] Filed: Mar. 1, 1985

[51] Int. Cl.[4] .................. B29D 23/04; B29F 3/04; B29F 3/02; B01F 7/24

[52] U.S. Cl. .................. 264/209.8; 425/376 A; 425/467

[58] Field of Search ............. 264/209.8; 425/131.1, 425/133.1, 208, 207, 113, 380, 376 A, 467

[56] References Cited

U.S. PATENT DOCUMENTS

| | | | |
|---|---|---|---|
| 2,669,750 | 2/1954 | Keeney | 425/207 X |
| 3,130,448 | 4/1964 | Tomlinson | 425/208 X |
| 3,345,690 | 10/1967 | Hogen | 264/209.8 X |
| 3,355,769 | 12/1967 | Fogelberg | 425/208 |
| 3,487,503 | 1/1970 | Barr et al. | 425/208 |
| 3,511,479 | 12/1970 | Hendry | 425/208 X |
| 3,587,281 | 6/1968 | Lemelson | 264/209.8 X |
| 3,679,336 | 7/1972 | Bagley et al. | 425/131.1 X |
| 4,120,628 | 10/1978 | Simos | 425/131.1 |
| 4,134,952 | 1/1979 | Yoshikawa et al. | 425/133.1 X |
| 4,173,446 | 11/1979 | Larsen | 425/380 |
| 4,223,811 | 9/1980 | Czegledi | 425/208 X |
| 4,280,801 | 7/1981 | Wheeler et al. | 425/113 |
| 4,365,946 | 12/1982 | Anders | 425/467 X |
| 4,365,949 | 12/1982 | Nash | 425/467 X |
| 4,472,129 | 9/1984 | Siard | 425/376 A X |
| 4,533,308 | 8/1985 | Cloeren | 425/131.1 |

Primary Examiner—J. Howard Flint, Jr.
Attorney, Agent, or Firm—Gilbert E. Alberding

[57] ABSTRACT

A crosshead (10) and a method are provided for extruding a tubular layer of a thermoplastic material, or for coextruding tubular layers of various thermoplastic materials, without incurring a weld line in any of the layers. The crosshead (10) includes a supply passage (42), a distribution passage (46) which provides an annular flow of thermoplastic material around a mandrel (18) by providing separate flows that merge distal from the supply passage (42), a mixing passage (110) which serves as a first static mixer by dividing the stream of thermoplastic material into a plurality of streams (96) and subsequently merging the divided streams, and a forging passage (118) which serves as a second static mixer by compressively forging that thermoplastic material into a cross section of increased area prior to extruding the thermoplastic material through a die opening (38).

45 Claims, 7 Drawing Figures

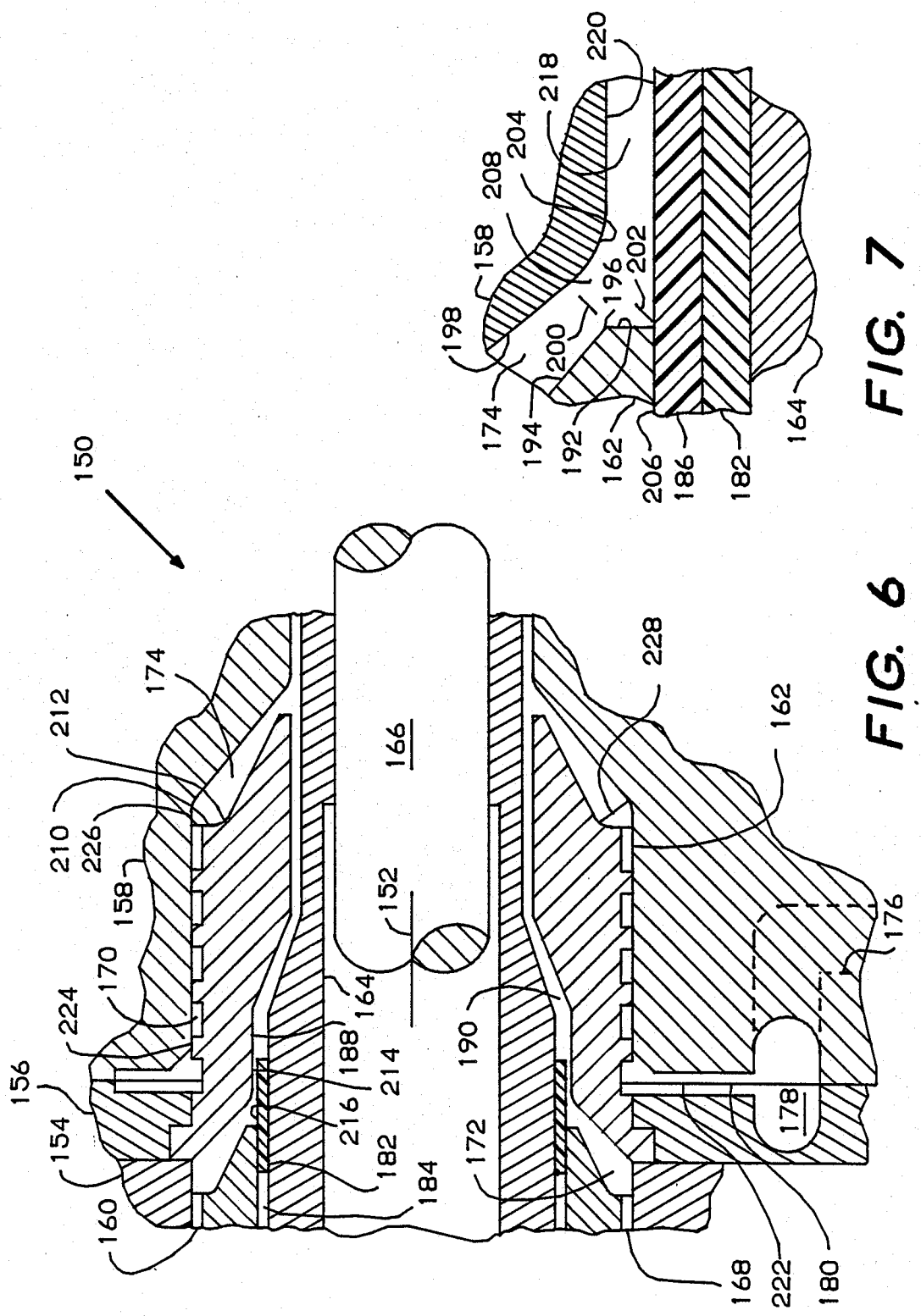

CROSSHEAD WITH STATIC MIXERS

TECHNICAL FIELD

The present invention relates generally to crossheads for extrusion of thermoplastic materials. More particularly, the present invention relates to a crosshead having static mixers for eliminating the weld line that occurs when some types of thermoplastic materials are fed transversely around both sides of a mandrel from a supply port, and then are extruded through the die opening.

BACKGROUND ART

In the extrusion of thermoplastic materials through a crosshead, it is common practice to pump the molten thermoplastic material into a supply passage and to force the molten thermoplastic material out through a die opening. The die opening may be of any desired cross sectional shape.

When a tubular layer of thermoplastic material is to be molded, it is necessary to provide a core or a mandrel inside the die opening. When this tubular layer of thermoplastic material is electrical insulation on a wire, then the wire, or the wire plus a previously extruded layer of thermoplastic material, is the core.

When a thermoplastic tubing is to be extruded, then a steel mandrel determines the inside diameter of the layer of thermoplastic material; or, in the case of coextruded tubing having a plurality of layers, the outside surface of an inner and previously extruded tubular layer of thermoplastic material is the core.

Further, it is common practice to extrude a thermoplastic material into a tubular shape, and then to process the tubing into bottles, or other containers, by pinching off a portion of the tubing, by placing the portion of tubing into a mold, and then by blowing the tubing into the shape of the mold.

Since the molten thermoplastic material must be supplied through a supply passage that opens on one side of the core or mandrel, the flow of thermoplastic material must flow transversely inward and then around the core or mandrel to form an annular flow of material that can be extruded longitudinally.

It is common practice to divide the flow of thermoplastic material into two streams that each flow half way around the longitudinal axis of the crosshead, and that join distal from the supply passage.

Some types of thermoplastic materials tend to develop a weld line where the separate branches of thermoplastic material join. This weld line exists in the annular and longitudinal flow of the thermoplastic material, in the finished tubing, and in a blown container made from the tubing.

Weld lines are detrimental for two reasons. One is that they are unsightly in what otherwise is a clear and glass-like container. The other reason is that they weaken the tubing; and so the tubing may burst at the weld line while being blown into a container.

Therefore, it is important to be able to produce extruded tubing without weld lines without regard to the type of thermoplastic material being extruded.

The problem of weld lines in tubing extruded from thermoplastic materials is even more critical for tubing that is to be used for fabricating containers for certain uses; because, for these particular uses, a homogeneous tubing of a single thermoplastic material is not the most desirable.

For instance, in the food processing industry, where the preservation of taste and the prevention of deterioration through contact with air is essential, and where the cost of the containers is quite competitive, it is economically imperative that bottles, jars, and tub-shaped containers be made with layers of various thermoplastic materials that differ in physical characteristics and cost.

Thus a container for the food processing industry may have a layer of thermoplastic material for the inside of the container that will not impart a foreign taste to the food product and that will conserve freshness by excluding air, a similar layer of thermoplastic material for the outside of the container, and an inner layer of a more economical thermoplastic material.

These multilayered plastic containers are blown from tubing that consists of several and sometimes as many as six, or more, layers of thermoplastic material.

Often, the containers are made of thermoplastics that are transparent; and uniform transparency is important to the food processor; and a weld line in any of the layers of thermoplastic in the extruded tubing results in a blemish that is deterimental to the appearance of the finished containers.

Some types of thermoplastic materials, particularly polypropylene which is ideal for the inner and outer surfaces of containers that are used by the food processing industry, are difficult to extrude without a weld line. Thus, it is extremely important to have a crosshead that will extrude multilayered tubing of various types of thermoplastic materials without forming a weld line in any of the layers.

In U.S. Pat. No. 3,355,769, Folgelberg disclosed a crosshead in which the flow of plastic material entered tangentially around the mandrel to prevent the weld line.

However, since some thermoplastic materials, such as polyvinyl chloride, degrade as a function of time and temperature, it is important that the molten thermoplastic material proceed through the crosshead in a minimum time, with a uniform velocity, and without stagnant areas.

In contast to these flow requirements, which dictate distribution passage size and shape, the distribution passage of Folgelberg is relatively large. Also, his distribution passage is uniform in cross section; so that the velocity of the molten plastic would be much too slow at a point diametrically opposite of the supply passage.

Wheeler, Jr., et al., in U.S. Pat. No. 4,280,801, show and describe the supplying of molten thermoplastic material to the die by means of a supply passage, a first distribution branch that is connected to the supply passage and that partially encircles the longitudinal axis in a first direction, and a second distribution branch that is connected to the supply passage and that partially encircles the longitudinal axis in the other direction and that joins, or abuts, the first branch diametrically distal from the supply passage.

The first and second distribution branches of Wheeler, Jr., et al., are proportioned in cross sectional area, being a maximum at the supply passage and reducing to a minimum where the branches join distal from the supply passage.

By this progressive reduction in cross sectional area in the flow paths, stagnation in the flow of the molten plastic has been substantially eliminated, a reduction in the time that any of the molten plastic is in the crosshead has been achieved, and a reduction in heat-caused degradation of the thermoplastic material has been achieved.

However, even though Wheeler, Jr., et al. achieved their objective of eliminating stagnant areas in the flow path, a weakness of crossheads that utilize their type of feed passages is that there is the tendency to develop weld lines in the extruded thermoplastic tubing. These weld lines occur at a circumferential location on the extruded tubing that corresponds to the point where the separate distribution branches join distal from the supply passage.

It is believed that the weld line is caused by a film of degraded material on the surface of the two branches of molten thermoplastic that meet distal from the supply passage; and so mixing of these two flows, to disperse the degraded film, should eliminate the weld line.

The prior art teaches the use of static mixing in the extrusion of thermoplastics. In U.S. Pat. No. 2,669,750, Keeney taught the use of static mixing to assure uniform color in extruded materials in which a dye is mixed with the powder of a thermoplastic.

Further, the prior art teaches the use of static mixing to eliminate weld lines in extruded tubing. Larsen, in U.S. Pat. No. 4,173,446, teaches the use of static mixing to eliminate weld lines where several radial branches of thermoplastic are fed to the extrusion die for large diameter tubing.

However, the prior art has not taught apparatus or methods that eliminate weld lines to the extent that is needed for the production of multilayered tubing for use in producing blown containers for the food processing industry.

In contrast, the present invention provides apparatus and method for completely eliminating weld lines in multilayer extruded tubing made from thermoplastic materials.

DISCLOSURE OF INVENTION

In the present invention, a crosshead is provided which includes the following primary parts:

a supply passage for receiving a molten thermoplastic material transversely of a longitudinal axis of the crosshead;

a distribution passage that includes a first distribution branch and a second distribution branch. The first distribution branch is in fluid communication with the supply passage and partially encircles the longitudinal axis in a first direction, and the second distribution branch is in fluid communication with the supply passage, partially encircles the longitudinal axis in the other direction, and substantially abuts the first distribution branch distal from the supply passage, thereby providing an annular flow of thermoplastic material around the longitudinal axis of the crosshead;

an annular die opening that comprises the annular space between a die that is disposed around the longitudinal axis and a core or mandrel die that is disposed in the die;

a mixing passage that is interposed intermediate of the distribution passage and the die opening, that includes a plurality of projections, that cuts the flow of thermoplastic material into a plurality of streams, that subdivides the plurality of streams, and that merges adjacent ones of the subdivided streams; and a compressive forging passage that is interposed intermediate of the mixing passage and the die opening.

The compressive forging passage consists of an annular and elongated passage wherein the flow of molten thermoplastic material is compressively forged into a cross section having a greater area than that of the mixing passage, and having a cross sectional area greater than that of the annular die opening.

Preferably, the mixing passage includes a longitudinally disposed bore that is cylindrical in shape, a longitudinally disposed mixing mandrel that is cylindrical in shape and that is disposed in the bore, and a plurality of diamond shaped projections that extend radially outward from the mixing mandrel, that are circumferentially disposed around the mixing mandrel, that are longitudinally disposed along the mixing mandrel, and that are formed by cutting a plurality of left hand and right hand spirals around the mixing mandrel.

Thus, the present invention utilizes two types of static mixers to eliminate the weld line. In the first of these two types of static mixers, the flow of thermoplastic material is successively cut into a plurality of separate streams and then reunited.

In the other of these types of static mixers, the annular flow of thermoplastic material from the first static mixer is compressively forged to a cross sectional area that is larger than the cross sectional area of the thermoplastic material discharged from the first static mixer; and mixing results from viscous shear as the thermoplastic material is displaced transversely.

The crosshead may include a plurality of die openings for extrusion of multilayered thermoplastic tubing. If so, the crosshead will include a supply passage and a distribution passage for each die opening.

Further, for each die opening that is intended for use with a thermoplastic material that has the tendency to form weld lines, the crosshead will include both of the static mixers as discussed above.

BRIEF DESCRIPTION OF DRAWINGS

FIG. 3 is a further enlarged cross section of the compressive forging passage of FIGS. 1 and 2, taken substantially the same as FIGS. 1 and 2;

FIG. 6 is a longitudinal cross section of a crosshead for extrusion of tubing consisting of several layers of various thermoplastic materials; and FIG. 7 is an enlarged cross section of a portion of the crosshead of FIG. 6, taken substantially as FIG. 6, and showing both a portion of a primary compression forging passage thereof and a secondary compressive forging passage thereof.

BEST MODE FOR CARRYING OUT THE INVENTION

Figure 1:
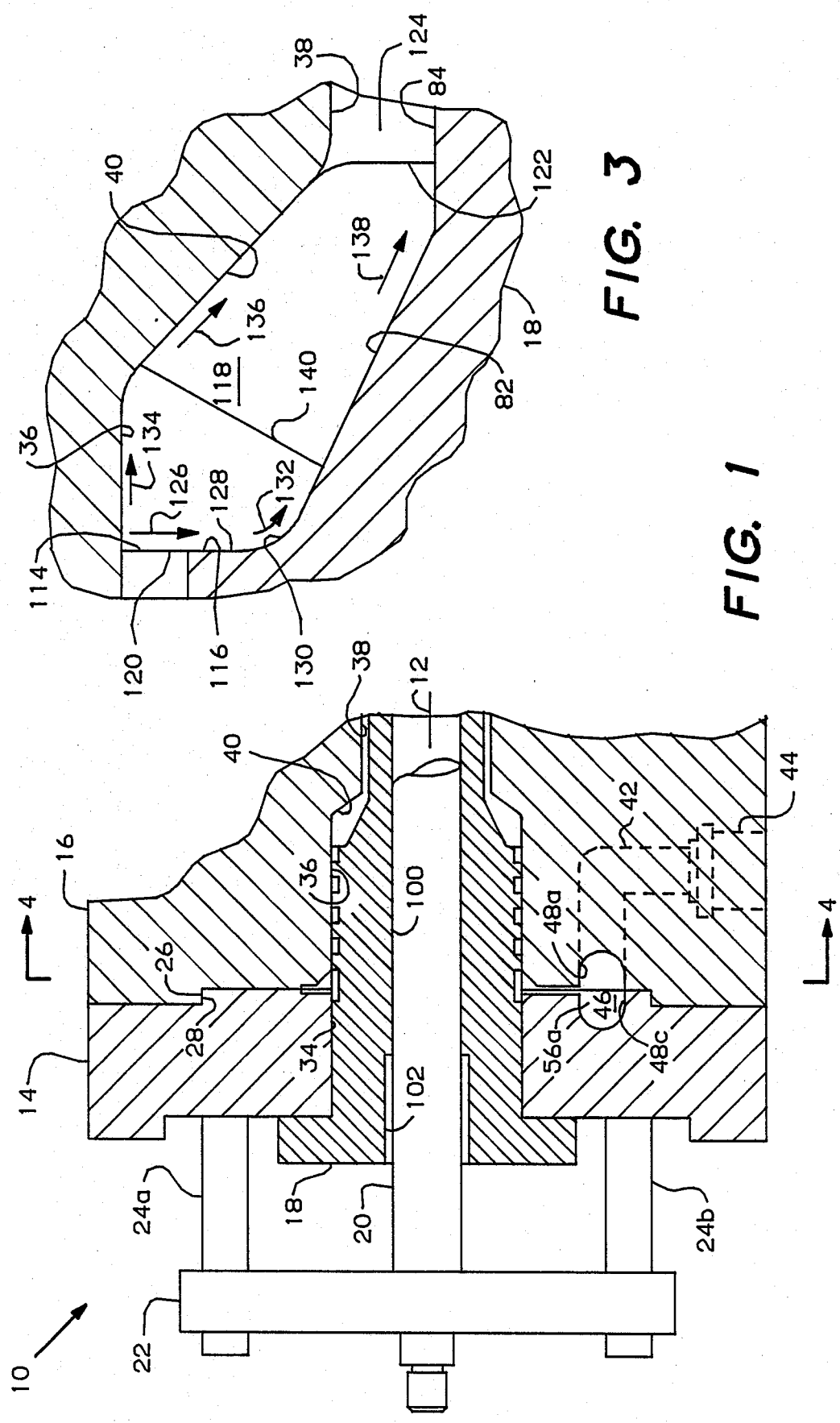
FIG. 1 is a longitudinal cross section of a crosshead of the present invention.

Referring now to FIG. 1, a crosshead 10 includes the following parts, all of which are circumferentially disposed around a longitudinal axis 12: a plate 14 that is cylindrically shaped, a plate 16 that is cylindrically shaped, a mandrel 18, and an adjusting rod 20.

The adjusting rod 20 is attached to the plate 14 by an adjusting yoke 22 and by standoff bolts 24a and 24b.

The plates 14 and 16 are radially aligned by a pilot 26 that is a part of the plate 14, that is circumferentially disposed around the axis 12, and that extends longitudinally along the axis 12, and by a cylindrically shaped counterbore 28 in the plate 16 that is concentric with the axis 12.

Figure 2:
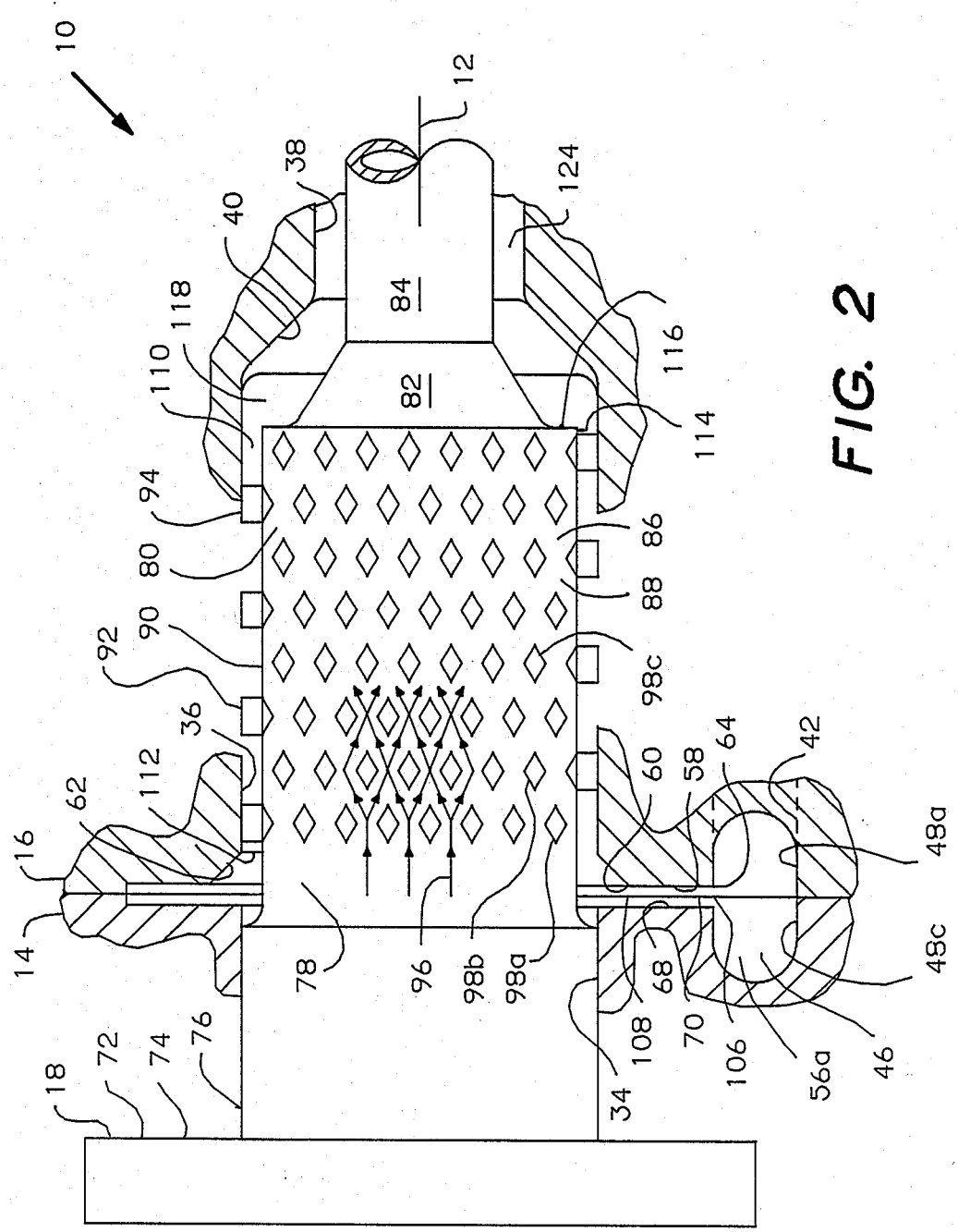
FIG. 2 is an enlarged view of the mandrel of the crosshead of FIG. 1 and a cross section of other portions of the crosshead of FIG. 1, taken substantially the same as FIG. 1.

Referring now to FIGS. 1 and 2, the plate 14 includes a bore 34 that is concentric with the axis 12; and the plate 16 includes a bore 36 that is equal in diameter to the bore 34 and that is concentric therewith.

The plate 16 also includes a die opening 38 that is concentric with the bore 36, a pre-extrusion cone 40 that connects the bore 36 and the die opening 38, a supply passage 42, and a supply port 44 that communicates with the supply passage 42.

Figures 4, 5:
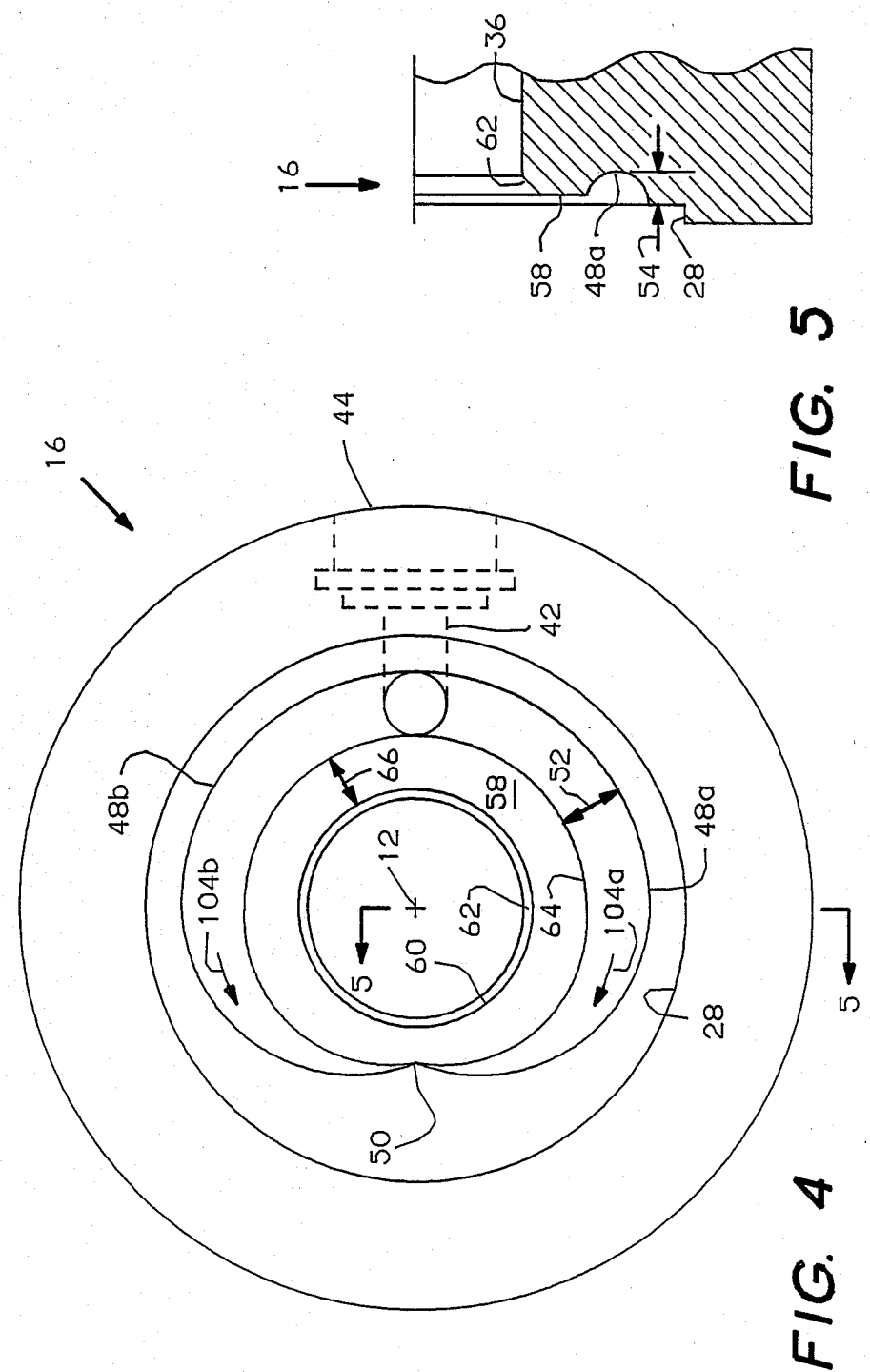
FIG. 4 is a transverse cross section of the crosshead of FIG. 1, taken substantially as shown by section line 4—4 of FIG. 1, except rotated as can be seen by the location of the supply port.
FIG. 5 is a partial cross section of the crosshead of FIG. 1, taken substantially as shown by section line 5—5 of FIG. 4, and showing the progressive decrease in the flow area of the distribution cavities of the distribution branches.

Referring now to FIGS. 1, 2, 4 and 5, the crosshead 10 includes a distribution passage 46. The distribution passage 46 includes four distribution cavities. Two of these distribution cavities, 48a and 48b, are disposed in the plate 16, and are shown in FIG. 4. The other two of the distribution cavities are disposed in the plate 14; and one of these, distribution cavity 48c, is shown in cross section in FIGS. 1 and 2.

The distribution cavity 48b is a right-hand variation of the distribution cavity 48a; and the other two distribution cavities, 48c and one distribution cavity of the plate 14 which is not shown, are a mirror image of the distribution cavities 48a and 48b. Therefore, a description of one distribution cavity will suffice for all four.

The distribution cavity 48a communicates with the supply passage 42, is disposed radially outward from the longitudinal axis 12, extends circumferentially a part of the way around the axis 12 from the supply passage 42 in a first direction and terminates at a point 50 that is diametrically distal from the supply passage 42.

A radial width 52 of the distribution cavity 48a progressively decreases from the supply passage 42 to the point 50 as can be seen in FIG. 4; and a depth 54 of the distribution cavity 48a progressively decreases from the supply passage 42 to the point 50 as is indicated by the decrease in the depth 54 of the distribution cavity 48a in FIG. 5 as compared to the depth 54 of the distribution cavity 48a as shown in FIG. 1.

Therefore the cross sectional area of the distribution cavity 48a progressively decreases from the supply passage 42 to the point 50.

Two of the distribution cavities, 48a and 48c, cooperate to provide a first distribution branch 56a; and the other two distribution cavities, 48c and a fourth distribution cavity that is not shown, cooperate to provide another distribution branch, not shown.

Thus, the distribution branch 56a communicates with the supply passage 42, is disposed radially outward from the longitudinal axis 12, extends circumferentially a part of the way around the axis 12 in a first direction, progressively decreases in cross sectional area from a maximum proximal to the supply passage 42 to a minimum where it terminates at the point 50 diametrically distal from the supply passage 42.

In like manner, the other distribution branch, not shown nor numbered, includes the distribution cavity 48c of the plate 14, communicates with the supply passage 42, is disposed radially outward from the longitudinal axis 12, extends circumferentially a part of the way around the axis 12 in a second direction, progressively decreases in cross sectional area from a maximum proximal to the supply passage 42 to a minimum where it terminates at the point 50 diametrically distal from the supply passage 42, and cooperates with the distribution branch 56a to provide an annular flow of thermoplastic material around the longitudinal axis 12.

Referring now to FIGS. 1, 2, and 4, and referring more particularly to FIG. 2 for part numbers, the plate 16 includes a choke recess 58 that is disposed radially inward from the distribution cavities 48a and 48b and that is juxtaposed thereto.

As shown in FIG. 4, the choke recess 58 has an inner diameter 60 that is juxtaposed to a chamfer 62 which is disposed radially intermediate of the bore 36 and the choke recess 58; and the choke recess 58 has an outer diameter 64 that is eccentric to the axis 12 and that is juxtaposed to the distribution cavities 48a and 48b.

As seen in FIG. 4, the inner diameter 60 of the choke recess 58 is concentric with the longitudinal axis 12, the outer diameter 64 is eccentric to the axis 12; and the choke recess 58 has a radial land width 66 that decreases from the supply passage 42 to the point 50 of the distribution cavities 48a and 48b.

The plate 14 includes a similar choke recess 68 that is similarly disposed and similarly shaped; except that the choke recess 68 extends radially inward to the bore 34 rather than being terminated by a chamfer.

The choke recesses 58 and 68 cooperate to provide a choke passage 70 that extends radially inward from the distribution passage 46. And, as can be seen by the varying radial land width 66 of the choke recess 58, the choke passage 70 has a maximum radial width proximal to the supply passage 42 and a minimum radial width proximal to the point 50.

Referring now to FIG. 2, the mandrel 18 includes a shoulder portion 72 that includes a shoulder surface 74, a pilot portion 76 that is cylindrically shaped and that is disposed in the bore 34, a reduced diameter portion 78 that is juxtaposed to the pilot portion 76, a mixing mandrel portion 80 that is juxtaposed to the reduced diameter portion 78, a forging portion or conical portion 82 that is juxtaposed to the mixing mandrel portion 80, and an extrusion mandrel portion 84 that is juxtaposed to the conical portion 82.

The mixing mandrel portion 80 is cylindrically shaped except for a plurality of first grooves 86 that are spaced apart and that are spirally disposed in one direction around the mixing mandrel portion 80, and a plurality of second grooves 88 that are spaced apart and that are spirally disposed in the other direction.

Thus, the mixing mandrel portion 80 consists of a cylindrically shaped part 90 having diamond shaped projections 92 that project radially outward therefrom.

An outside surface 94 of the projections 92 is substantially equal in diameter to that of the bore 36.

Thus, molten thermoplastic material flowing longitudinally between the mixing mandrel portion 80 and the bore 36 is cut into a plurality of streams 96 by a first circumferentially disposed row 98a of the diamond shaped projections 92.

Then, adjacent ones of the plurality of streams 96 are subdivided and merged by a second circumferentially disposed row 98b of diamond shaped projections 92; and so the mixing process continues for each circumferentially disposed row 98c, etc. of the diamond shaped projections 92.

Referring to FIG. 1, the mandrel 18 includes a bore 100 and a counterbore 102 that are cylindrically shaped, that are concentric with the axis 12, and that receive the adjusting rod 20.

Referring now to FIGS. 1 and 4, molten thermoplastic material is injected into the supply port 44, flows through the supply passage 42, and is distributed around the longitudinal axis 12 by the distribution passage 46.

The molten thermoplastic material is supplied a part of the way around the longitudinal axis 12 by the distribution branch 56a of FIG. 1, and is distributed a part of the way around the longitudinal axis 12 by a similar distribution branch, not shown.

Since the distribution branches 56a and not shown both consist of two of the four distribution cavities, 48a, 48b, 48c, and another distribution cavity, not shown, the flow of the thermoplastic material can be described with relation to the distribution cavities 48a and 48b of FIG. 4.

Referrring to FIGS. 2 and 4, the molten thermoplastic flows in streams 104a and 104b from the supply passage 42 to the point 50, thereby substantially encircling the longitudinal axis 12, and thereby providing an annular flow of the thermoplastic material.

This annular flow of thermoplastic material flows radially inward toward the longitudinal axis 12; and in flowing radially inward, is forced to flow through the choke passage 70 which is seen in FIG. 2.

As previously described, the choke passage 70 has a radial width which is determined by the radial land width 66 of the choke recess 58; so, as can be understood by considering the varying land width 66 of FIG. 4, the choke passage 70 provides a greater restriction on the flow of the thermoplastic material circumferentially proximal to the supply passage 42 than it does circumferentially proximal to the point 50.

The purpose for this is to cooperate with the progressive decrease in the cross sectional area of the distribution cavities 48a, etc. to provide for uniform velocity of the molten thermoplastic in all parts of the two distribution branches, 56a and not shown.

The choke passage 70 has an outer annulus 106 which equals the outer diameter 64 of the choke recess 58 multiplied by the combined depths of the choke recesses 58 and 68. In like manner, the choke passage 70 has an inner annulus 108 which equals the inner diameter 60 of the choke recess 58 multiplied by the combined depths of the choke recesses 58 and 68.

Since the cross sectional area of the inner annulus 108 is inherently smaller than the cross sectional area of the outer annulus 106, the cross sectional area of the inner annulus 108 is used to size the choke passage 70.

Referring now to FIG. 1 for a more complete picture and to FIG. 2 for part numbers, after the molten thermoplastic flows radially inward through the choke passage 70, it flows into a mixing passage 110.

The mixing passage 110 consists of the radial space that exists between the bore 36 and the mixing mandrel portion 80 of the mandrel 18; and the flow area through the mixing passage 110 consists of the area of the grooves 86 and 88 of the mixing mandrel portion 80. This flow area varies as the grooves 86 and 88 alternately merge and separate.

The mixing passage 110 includes an entry 112 that coincides with the chamfer 62 and an exit 114 that coincides with a circumferential shoulder 116 of the mandrel 18.

The flow area of the mixing passage 110, for design purposes, is defined by the cross sectional area at the exit 114; and, since the projections 92 end at the exit 114, the cross sectional area of the mixing passage is equal to the difference in cross sectional area between the bore 36 and the cylindrically shaped part 90.

Referring now to FIGS. 2 and 3, and more particularly to FIG. 3, after flowing longitudinally through the mixing passage 110, the molten thermoplastic material enters a compressive forging passage 118 which consists of the volume between the conical portion 82, the circumferential shoulder 116 of the mandrel 18, the bore 36, and the pre-extrusion cone 40.

The compressive forging passage 118 has an inlet 120 which coincides with, and which is identical to, the exit 114 of the mixing passage 110; and the compressive forging passage 118 has an outlet 122 which coincides with the junction of the pre-extrusion cone 40 and the die opening 38.

A critical factor of the compressive forging passage 118 is the increase in cross sectional area from that of the mixing passage 110. Another critical factor is the rate of increase in the cross sectional area.

Preferably, the cross sectional area of the compressive forging passage 118, at the longitudinal location of maximum cross sectional area, is at least twice the area of the mixing passage 110 at the exit 114 thereof; and preferably the rate of increase in area in the compressive forging passage 118 instantaneously reaches at least 10 cm.$^2$/cm.

The thermoplastic material in the forging passage 118 is then extruded through an annular extrusion opening 124 which consists of the annular space between the die opening 38 and the extrusion mandrel portion 84 of the mandrel 18.

For the purpose of describing the present invention, the cross sectional area of the extruded material is determined by the annular extrusion opening 124; even though it is common practice to adjustably reduce or adjustably increase the size of the extruded product after it enters the die opening 38 by means of a mandrel portion, not shown, which is attached to the adjusting rod 20 of FIG. 1.

A static mixing function could be achieved by disturbing the flow of thermoplastic material and yet not dividing the flow thereof into separate streams. However, in the preferred configuration, the cylindrically shaped part 90 serves as a first wall of the mixing passage 110, the projections 92 are integral with the cylindrically shaped part 90 and extend radially outward to the bore 36, and the bore 36 serves as a second wall of the mixing passage 110; so that longitudinal flow of an annular stream of thermoplastic material is cut into a plurality of streams 96 by the projections 92.

In contrast to static mixing by dividing the flow into streams 96 and subsequently subdividing and merging adjacent ones of the streams 96, the forging passage 118 provides a static mixing function in which the thermoplastic material coming from the mixing passage 110 is compressively forged to a larger cross sectional area than that of the material exiting from the mixing passage 110.

While the rate of longitudinal increase in area of the compressive forging passage 118 should be at least 10 cm.²/cm., preferably, this rate of change approaches infinity at the inlet 120 of the compressive forging passage 118.

That is, preferably, the rate of increase is determined by a shoulder, such as the circumferential shoulder 116 of the mandrel 18; and, since the circumferential shoulder 116 is transverse to the longitudinal axis 12, the rate of increase of area theoretically is infinite.

Thermoplastic materials are extruded at the lowest temperatures that are practical in order to prevent temperature caused degradation of the material. Thus, the viscosity of the thermoplastic material is extremely high during the extruding process; and because of this high viscosity, as the cross sectional area of the compressive forging passage 118 increases, transverse flow, or compressive forging of the thermoplastic material in the compressive forging passage 118, is assured.

This transverse flow of the thermoplastic material is represented in FIG. 3 by a flow line 126.

In this compressive forging action, there is a change in the cross sectional area of the thermoplastic material which results in a shearing action between adjacent portions of the thermoplastic material; and so the compressive forging passage 118 provides mixing by a viscous shearing action.

Further, in the preferred embodiment, the rate of increase of the cross sectional area of compressive forging passage 118 is determined by the circumferential shoulder 116 which is disposed radially inward from the exit 114 of the mixing passage 110.

So, all of the compressive forging action is radially inward, as opposed to being partially inward and partially outward. So, the transverse distance of the compressive forging action is greater than it would be if a part of the material were forged radially inward and a part were forged radially outward.

Thus, the shearing action in the thermoplastic material, which provides the mixing function in the compressive forging passage 118, is greater than it would be if part of the thermoplastic material were forged radially inward and part of the material were forged radially outward.

When the increase in cross sectional area of the compressive forging chamber is determined by a transversely disposed shoulder, such as the circumferential shoulder 116, the rate of change of area is infinite at the shoulder 116, and the rate of viscous shear is quite high.

As the thermoplastic material is forged inwardly to a point 128 where a radius 130 joins the circumferential shoulder 116 to the conical portion 82, the radius 130 assists in changing the direction of flow from transverse to an angular direction that is intermediate of transverse and longitudinal, as indicated by a flow line 132.

While the discussion of the flow in the compressive forging passage 118 thus far has been on the transverse flow of the thermoplastic material, it is obvious that a longitudinal flow exists, and this longitudinal flow is represented by a flow line 134.

It is hypothesized that the longitudinal flow of thermoplastic material that is near the bore 36, as indicated by the flow line 134, does not receive as thorough a mixing action by viscous shear as does the flow of material that is disposed radially inward from the bore 34.

However, the preferred embodiment provides additional mixing for the flow of material that is near the bore 36 before it reaches the outlet 122 of the compressive forging passage 118. This additional mixing is provided by means of a pre-extruding action of the pre-extrusion cone 40. The material that is disposed proximal to the bore 36 is extruded radially inward, as well as longitudinally by the pre-extrusion cone 40, as indicated by a flow line 136, thereby causing a mixing by viscous shearing.

Since the pre-extrusion flow near the pre-extrusion cone 40 is directed radially inward at a greater angle, as seen by comparing the flow line 136 to a flow line 138, than flow near the conical portion 82, flow near the bore 36 receives more mixing by extrusion than flow that follows the flow line 132.

Thus, the material, near the bore 36, that has received the least mixing during the compressive forging action, receives the most mixing as the thermoplastic material is forged inwardly and pre-extruded by the pre-extrusion cone 40.

It should be noticed that increasing the ratio of the maximum cross sectional area of the compressive forging passage 118 to the cross sectional area of the mixing passage 110, not only increases the mixing action that occurs by compressive forging and the resultant viscous shear in the material, but also, the greater this ratio, the greater will be the ratio between the maximum cross sectional area of the compressive forging passage 118 and the cross sectional area of the annular extrusion opening 124.

So, an increase in the maximum cross sectional area of the forging passage 118, as indicated by a maximum cross section line 140 of FIG. 3, results in an increase in the mixing action by pre-extrusion.

Whether or not the thermoplastic material near the bore 36 receives less viscous mixing by the compressive forging action is only a hypothesis.

However, in actual testing, the crosshead 10, with features and with static mixing functions as described above, is remarkably effective in removing weld lines from tubing that is extruded from most thermoplastic materials.

A second embodiment of the present invention includes a secondary compressive forging chamber that provides additional static mixing, and that, together with the static mixing devices previously described, is effective to eliminate weld lines from tubing extruded from any single thermoplastic material, or combination of thermoplastic materials, with which this second embodiment has been tested.

Referring now to FIG. 6, a crosshead 150 includes at least three working sections. A working section consists of those parts that are required to extrude one tubular layer of thermoplastic material. The crosshead 150 is capable of extruding a tube having three layers of thermoplastic material; so the crosshead 150 includes three working sections.

The crosshead 150, in a first working section thereof, not shown, includes a supply passage, a distribution passage, a choke passage, a mixing passage, a compressive forging passage, a mandrel, and an annular extrusion opening, none of which are shown, but all of which are similar to the like-named parts as described in conjunction with FIGS. 1-5.

The crosshead 150 includes two more working sections that each include like-named parts and that each serve to extrude another tubular layer of thermoplastic material onto a previously extruded tubular layer of thermoplastic material.

However, in the description that follows, the parts are named as if a first working section does not exist.

The crosshead 150 includes a longitudinal axis 152; and, in second and third working sections of the crosshead 150, the following parts are circumferentially disposed around the longitudinal axis 152: a first plate 154, a second plate 156, a body 158, a first mandrel 160, a second mandrel 162, a third mandrel 164, and an adjusting rod 166.

The adjusting rod 166 functions in the same manner as described for the adjusting rod 20.

The crosshead 150 includes a first mixing passage 168 and a second mixing passage 170 that are similar to the mixing passage 110 of FIG. 2; and the crosshead 150 includes a first primary compressive forging passage 172 and a second primary compressive forging passage 174 that are similar to the compressive forging passage 118 of FIG. 2.

Molten thermoplastic material is fed to the mixing passage 170 and then to the second primary compressive forging passage 174 by a supply passage 176, a distribution passage 178, and a choke passage 180 that are similar to the supply passage 42, the distribution passage 46, and the choke passage 70, respectively, of FIG. 2.

In like manner, molten thermoplastic material is fed to the mixing passage 168 and to the first primary compressive forging passage 172 by a supply passage, a distribution passage, and a choke passage which are not shown but which are similar to other like-named passages of FIG. 6.

Referring now to FIGS. 6 and 7, in operation, a first tubular layer 182 of thermoplastic material has been extruded through an annular extrusion opening, not shown but similar to the annular extrusion opening 124 of FIGS. 1-3, and has progressed longitudinally along an annular opening 184 that lies radially intermediate of the first mandrel 160 and the third mandrel 164.

A second tubular layer 186 of thermoplastic material, shown only in FIG. 7, has been extruded between the first tubular layer 182 and a die opening 188 of the mandrel 162. Then the tubular layers 182 and 186, both shown in FIG. 7, have been forged together in a transition section 190 that lies annularly intermediate of the second mandrel 162 and the third mandrel 164.

Referring again to FIGS. 6 and 7, but more particularly to FIG. 7, a portion of the primary compressive forging passage 174 is shown in FIG. 7 as well as portions of the body 158, the second mandrel 162, and the third mandrel 164.

The second mandrel 162 includes a transverse nose 192 that intersects a conical portion 194 of the second mandrel 162; and the intersection of the transverse nose 192 and the conical portion 194 form a circumferential edge 196. The body 158 includes a primary pre-extrusion cone 198 that is simular to the pre-extrusion cone 40 of FIG. 3.

The minimum cross sectional area of the primary compressive forging passage 174 occurs at a line 200 that extends orthogonally from the primary pre-extrusion cone 198 to the circumferential edge 196; and the cross sectional area through which the thermoplastic material flows increases after passing the line 200.

The cross sectional flow area increases until the flow of thermoplastic material reaches a line 202 and thereafter decreases as the thermoplastic material flows between a secondary pre-extrusion cone 204 of the body 158 and an outside diameter 206 of the second tubular layer 186 of thermoplastic material.

Thus it can be seen that the crosshead 150 includes a secondary forging compressive chamber 208 that starts at the line 200, that increases to a maximum at the line 202, and that decreases after leaving the line 202.

Further, it can be seen that the secondary compressive forging chamber 208 is bounded by the outside diameter 206 of the second tubular layer 186, by the transverse nose 192, and by the secondary pre-extrusion cone 204.

The secondary compression forging chamber 208 adds an additional compressive forging action, and thus an additional static mixing function to the static mixing that is provided by the second mixing passage 170 and by the primary compressive forging chamber 174.

Further, the fact that the crosshead 150 includes both the primary compressive forging passage 174 and the secondary compressive forging passage 208, and that the compressive forging passages 174 and 208 are separated by a minimum area at the line 200, it is apparent that another static mixing function, namely, pre-extrusion, is interposed intermediate of the static mixing functions that are provided by the primary and secondary compressive forging passages, 174 and 208.

Therefore, the crosshead 150 of FIGS. 6 and 7 provides four static mixing functions for one tubular layer of thermoplastic material. In like manner, the crosshead 150 may be designed to provide all four of these static mixing functions for any other, or for all, of the tubular layers of thermoplastic material.

The present invention provides a first static mixer in which the thermoplastic material is divided into a plurality of streams, subdivided, and subsequently merged.

The present invention provides a second static mixer in which a primary compressive forging passage provides static mixing by compressively forging the thermoplastic material into an area having a greater cross sectional area that the material leaving the first static mixer.

The present invention provides a third static mixer in which the thermoplastic material receives additional static mixing by pre-extruding the thermoplastic material to a cross sectional area that is smaller than the maximum cross sectional area of the primary compressive forging passage.

The present invention provides a fourth static mixer in which a secondary compressive forging passage provides additional static mixing. This additional static mixing is achieved by compressively forging the thermoplastic material into a cross sectional area that is greater than the cross sectional area to which the thermoplastic material was reduced by pre-extrusion.

Preferably, in the compressive forging passage 118 of FIG. 3, or in the primary compressive forging passage 174 of FIG. 6, the compressive forging action is entirely in one direction, that is, all radially inward, or all radially outward.

Preferably, in the compressive forging passage 118 of FIG. 3, or in the primary compressive forging passage 174 of FIG. 6, the rate of change of area of the compressive forging passage is determined by a transversely disposed shoulder, such as the circumferential shoulder 116 of FIG. 3, or a circumferential shoulder 210 of FIG. 6; so that the rate of change of area is theoretically infinite at the shoulders 116 and 210.

Preferably, in the compressive forging passage 118 of FIG. 3, and in the primary compressive forging passage 174 of FIG. 6, the transversely disposed shoulder, 116 or 210, terminates at a radius, such as the radius 130 of FIG. 3, or a radius 212 of FIG. 6, to prevent an area of stagnant flow.

However, in the secondary compressive forging passage 208 of FIG. 7, the movement of the second tubular layer 186 serves to prevent a stagnant area at the intersection of the nose 192 and the outside diameter 206 of the tubular layer 186.

Referring finally to FIGS. 6 and 7, the annular extrusion openings for the crosshead 150 include an annular extrusion opening 214 that lies radially intermediate of the die opening 188 and an outside diameter 216 of the tubular layer 182, and an annular extrusion opening 218 that lies radially intermediate of a die opening 220 and the outside diameter 206 of the tubular layer 186.

Having described both the crosshead 10 and the crosshead 150 in considerable detail, some consideration of design parameters is in order.

In the preferred embodiment of FIGS. 6 and 7, for one typical application, the cross sectional areas and the area relationships of various parameters for extruding polypropylene through the annular extrusion opening 218 are given below.

The cross sectional areas are as follows: 2.69 cm$^2$ (0.417 in$^2$) at an inner annulus 222 of the choke passage 180; 4.80 cm$^2$ (0.744 in$^2$) at an entry 224 of the mixing passage 170 and at an exit 226 of the mixing passage 170; 16.47 cm$^2$ (2.553 in$^2$) maximum in the compressive forging passage 174 at a line 228; 2.21 cm$^2$ (0.342 in$^2$) at the completion of the pre-extrusion step as identified by the line 200; 5.41 cm$^2$ (0.839 in$^2$) maximum in the secondary compressive forging passage 208 at the line 202; and 2.15 cm$^2$ (0.333 in$^2$) in the annular extrusion opening 220.

The minimum cross sectional area of the mixing passage 170 occurs when adjacent ones of the streams 96 of FIG. 2 merge to flow between adjacent ones of the diamond shaped projections 92; and the minimum cross sectional area for the particular application given here is 1.67 cm$^2$ (0.259 in$^2$).

For the cross sectional areas listed above, the cross sectional area of the mixing passage 170, at the entry 224, is 56 percent of the cross sectional area of the choke passage 180 at an inner annulus 222.

The cross sectional area of the mixing passage 170, at the entry 224, should be less than 67 percent of the area of the choke passage 180 at the inner annulus 222.

The cross sectional area of the flow path increases 343 percent from the mixing passage 170 to the line 228 of the primary compressive forging passage 174. Preferably, this increase should be at least 200 percent.

The pre-extrusion area, at the line 200, decreases to 15.2 percent the area of the compressive forging passage 174 at the line 228. Preferably the pre-extrusion area should decrease to 33 percent, or less, of the maximum area of the primary compressive forging passage 174.

The cross sectional area of the secondary compressive forging passage 208, at the line 202, increases to 205 percent as compared to the pre-extrusion area at the line 200. Preferably this increase in cross sectional area should be at least 50 percent.

The cross sectional area of the secondary compressive forging passage 208, at the line 202, is 210 percent of the area of the annular extrusion opening 218. Preferably, the area at the line 202 should be at least 50 percent larger than the extrusion opening 218.

Summarizing the advantages and principles of the present invention, weld lines in either single or multilayer thermoplastic tubing are eliminated by static mixing that includes dividing and reuniting the flow and by compressive forging.

For extruding single or multilayer tubing in which one or more layers of the tubing is extruded from a thermoplastic material that has an extreme propensity to develop weld lines, four static mixing functions may be included for extruding such layers of thermoplastic material.

These four static mixing functions are: dividing and reuniting the flow, primary compressive forging, pre-extrusion, and secondary compressive forging.

While specific apparatus has been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

Industrial Applicability

The present invention provides a crosshead for the extrusion of single and multilayer tubing of thermoplastic materials and for eliminating the weld line that tends to occur where opposite branches of the thermoplastic material join distal from the supply passage.

Thus, the present invention is applicable to the extrusion of thermoplastic materials into tubular shapes whenever weld lines in the tubing are detrimental from a strength standpoint or from an appearance standpoint.

More particularly, the present invention is applicable to the food processing industry where food containers are blown from multilayered tubing, where transparent containers are used, and where a blemish in a blown container, resulting from a weld line in the extruded tubing, is considered to be detrimental to the appearance of the container.

What is claimed is:

1. A crosshead for extruding a thermoplastic material along a longitudinal axis, which crosshead comprises:

supply passage means, being disposed radially outward from said longitudinal axis, for receiving molten thermoplastic material;

distribution passage means, comprising a first distribution branch that is in fluid communication with said supply passage means, for providing an annular flow of said thermoplastic material;

mixing passage means, being in fluid communication with said annular flow of said distribution passage means, and having an exit with a first cross sectional area, for mixing said thermoplastic material as said thermoplastic material flows through said mixing passage means;

forging passage means, being disposed circumferentially around said longitudinal aixs, being in fluid communication with said exit of said mixing passage means, and having an outlet that is in fluid communication with said die opening, for compressively forging said thermoplastic material into a tubular layer of thermoplastic material having a second cross sectional area that is greater than said first cross sectional area; and extrusion opening means, comprising a core that is disposed along said longitudinal axis, comprising a die opening that is annularly disposed around said core, and comprising the annular space between said core and said die opening, for extruding said compressively forged layer of thermoplastic material into a tubular layer of thermoplastic material having a third cross sectional area that is substantially equal to said annular space.

2. A crosshead as claimed in claim 1 in which said compressive forging of said thermoplastic material to a second cross sectional area that is greater than said first cross sectional area comprises forging said second cross sectional area to a cross sectional area that is more than twice as large as said first cross sectional area.

3. A crosshead as claimed in claim 1 in which the rate of increase of cross sectional area from said first cross sectional area of said mixing passage means to said second cross sectional area of said forging passage means instantaneously exceeds a rate of change of area of 10 cm.$^2$/cm.

4. A crosshead as claimed in claim 1 in which said forging passage means, and said greater cross sectional area of said tubular layer of thermoplastic material thereof, comprises a circumferential shoulder in said forging passage means that is disposed substantially transverse to said longitudinal axis.

5. A crosshead as claimed in claim 1 in which said crosshead includes pre-extruding means, being interposed intermediate of said forging passage means and said die opening, for pre-extruding said thermoplastic material into a fourth cross sectional area that is smaller than said second cross sectional area of said forging passage means; and said crosshead includes secondary forging passage means, being interposed intermediate of said pre-extruding means and said die opening, for compressively forging said thermoplastic material into a fifth cross sectional area that is greater than said fourth cross sectional area and that is greater than said third cross sectional area of said extrusion opening means.

6. A crosshead as claimed in claim 5 in which said fourth cross sectional area of said pre-extruding means is less than one-third of said second cross sectional area of the first said forging passage means.

7. A crosshead as claimed in claim 5 in which said fifth cross sectional area of said secondary forging passage means is more than 50 percent larger than said fourth area of said pre-extruding means.

8. A crosshead as claimed in claim 5 in which said fifth cross sectional area of said secondary forging passage means is more than 50 percent larger than said third area of said extrusion opening means.

9. A crosshead as claimed in claim 1 in which said mixing passage means comprises first and second walls; and a plurality of protrusions that extend from one of said walls toward the other of said walls.

10. A crosshead as claimed in claim 9 in which said extending of said protrusions comprise said protrusions extending substantially to the other of said walls; whereby said thermoplastic material is cut into a plurality of streams by said protrusions.

11. A crosshead as claimed in claim 1 in which said mixing passage means comprises dividing means for dividing said flow of thermoplastic material into a plurality of streams; and said mixing passage means comprises merging means for merging said plurality of streams of thermoplastic material.

12. A crosshead as claimed in claim 1 in which said mixing passage means comprises means for dividing said flow of thermoplastic material into a plurality of streams, for subdividing said plurality of streams, and for merging adjacent ones of said subdivided streams.

13. A crosshead as claim in claim 1 in which said crosshead includes choke passage means, being disposed radially inward of said distribution passage means, being substantially in annular fluid communication with said distribution passage means, having an inner annulus that is substantially in annular fluid communication with said mixing passage means, and having a sixth cross sectional area at said inner annulus that is less than three-fourths of said first cross sectional area of said mixing passage means.

14. A crosshead as claimed in claim 1 in which said crosshead includes choke passage means, being disposed radially inward of said distribution passage means, being substantially in annular fluid communication with said distribution passage means, having an inner annulus that is substantially in annular fluid communication with said mixing passage means, and having a sixth cross sectional area at said inner annulus that is less than three-fourths of said first cross sectional area of said mixing passage means;

said mixing passage means comprises means for dividing said flow of thermoplastic material into a plurality of streams, for subdividing said plurality of streams, and for merging adjacent ones of said subdivided streams; and said forging passage means, and said greater cross sectional area of said second cross sectional area, comprises a circumferential shoulder in said forging passage means that is disposed substantially transverse to said longitudinal axis.

15. A crosshead as claimed in claim 14 in which said crosshead includes pre-extruding means, being interposed intermediate of said forging passage means and said die opening, for pre-extruding said thermoplastic material into a fourth cross sectional area that is less than one-third of said second cross sectional area of said forging passage means; and said crosshead includes secondary forging passsage means, being interposed intermediate of said pre-extruding means and said die opening, for compressively forging said thermoplastic material into a fifth cross sectional area that is more than 50 percent larger than said fourth cross sectional area of said pre-extruding means and that is more than 50 percent larger than said third cross sectional area of said extrusion opening means.

16. A crosshead for extruding a thermoplastic material along a longitudinal axis, which crosshead comprises:

supply passage means, being disposed radially outward from said longitudinal axis, for receiving molten thermoplastic material;

distribution passage means, having a first distribution branch that is in fluid communication with said supply passage means and that partially encircles said longitudinal axis in one direction, and having a second distribution branch that is in fluid communication with said supply passage means and that partially encircles said longitudinal axis in the other direction, for substantially encircling said longitudinal axis, and for providing an annular flow of said thermoplastic material;

mixing passage means being disposed circumferentially around said longitudinal axis, comprising a bore that is circumferentially disposed around said longitudinal axis and a mandrel that is disposed in said bore, having an entry that is substantially in annular fluid communication with said annular flow of said distribution passage means, and having an exit with a first cross sectional area that is disposed longitudinally distal from said entry, for mixing said thermoplastic material as said thermoplastic material flows through said mixing passage means from said entry to said exit;

forging passage means, being disposed circumferentially around said longitudinal axis, having an inlet that is substantially in annular fluid communication with said exit of said mixing passage means, having an outlet that is substantially in annular fluid communication with said die opening, for compressively forging said thermoplastic material to a second cross sectional area that greater than said first cross sectional area; and extrusion opening means, comprising a core that is disposed along said longitudinal axis, comprising a die opening that is disposed annularly around said core, and comprising the annular space intermediate of said core and said die opening, for extruding said compressively forged layer of thermoplastic material into a tubular layer of thermoplastic material having a third cross sectional area that is substantially equal to said annular space.

17. A crosshead as claimed in claim 16 in which said compressive forging of said thermoplastic material to said second cross sectional area that is greater than said first cross sectional area comprises forging said second cross sectional area to a cross sectional area that is more than twice as large as said first cross sectional area.

18. A crosshead as claimed in claim 16 in which the rate of increase of cross sectional area from said first cross sectional area of said mixing passage means to said second cross sectional area of said forging passage means instantaneously exceeds a rate of change of area of 10 cm.$^2$/cm.

19. A crosshead as claimed in claim 16 in which said forging passage means, and said greater cross sectional area of said tubular layer of thermoplastic thereof, comprises a circumferential shoulder in said forging passage means that is disposed substantially transverse to said longitudinal axis.

20. A crosshead as claimed in claim 16 in which said crosshead includes pre-extruding means, being interposed intermediate of said forging passage means and said die opening, for pre-extruding said thermoplastic material into a fourth cross sectional area that is smaller than said second cross sectional area of said forging passage means; and said crosshead includes secondary forging passage means, being interposed intermediate of said pre-extruding means and said die opening, for compressively forging said thermoplastic material into a fifth cross sectional area that is greater than said fourth cross sectional area and that is greater than said third cross sectional area of said extrusion opening means.

21. A crosshead as claimed in claim 20 in which said fourth cross sectional area of said pre-extruding means is less than one-third of said second cross sectional area of said forging passage means.

22. A crosshead as claimed in claim 20 in which said fifth cross sectional area of said secondary forging passage means is more than 50 percent greater than said fourth area of the said pre-extruding means.

23. A crosshead as claimed in claim 20 in which said fifth cross sectional area of said secondary forging passage means is more than 50 percent larger than said third area of said extrusion opening means.

24. A crosshead as claimed in claim 16 in which said mixing passage means comprises a plurality of protrusions that extend radially outward from said mandrel toward said bore.

25. A crosshead as claimed in claim 24 in which said extending of said protrusions comprises said protrusions extending substantially to said bore; whereby said thermoplastic material is cut into a plurality of streams by said protrusions.

26. A crosshead as claimed in claim 16 in which said mixing passage means comprises dividing means for dividing said flow of thermoplastic material into a plurality of streams; and said mixing passage means comprises merging means for merging said plurality of streams.

27. A crosshead as claimed in claim 16 in which said mixing passage means comprises means for dividing said flow of thermoplastic material into a plurality of streams, for subdividing said plurality of streams, and for merging adjacent ones of said subdivided streams.

28. A crosshead as claimed in claim 16 in which said crosshead includes choke passage means, being disposed radially inward of said distribution passage means, having an outer annulus that is substantially in annular fluid communication with said distribution passage means, having an inner annulus that is substantially in annular fluid communication with said mixing passage means, and having a sixth cross sectional area at said inner annulus that is less than three-fourths of said first cross sectional area of said mixing passage means.

29. A crosshead as claimed in claim 16 in which said crosshead includes choke passage means, being disposed radially inward of said distribution passage means, having an outer annulus that is substantially in annular fluid communication with said distribution passage means, having an inner annulus that is substantially in annular fluid communication with said mixing passage means, and having a sixth cross sectional area at said inner annulus that is less than three-fourths of said first cross sectional area of said mixing passage means;

said mixing passage means comprises means for dividing said flow of thermoplastic material into a plurality of streams, for subdividing said plurality of streams, and for merging adjacent ones of said subdivided streams; and said forging passsage means, and said greater cross sectional area of said second cross sectional area, comprises a circumferential shoulder in said forging passage means that is disposed substantially tranverse to said longitudinal axis.

30. A crosshead as claimed in claim 29 in which said crosshead includes pre-extruding means, being interposed intermediate of said forging passage means and said die opening, for pre-extruding said thermoplastic material into a fourth cross sectional area that is less than one-third of said second cross sectional area of said forging passage means; and said crosshead includes secondary forging passage means, being interposed intermediate of said pre-extruding means and said die opening, for compressively forging said thermoplastic material into a fifth cross sectional area that is more than 50 percent larger than said fourth cross sectional area of said pre-extruding means and that is more than 50 percent larger than said third cross sectional area of said extrusion opening means.

31. A method for extruding a thermoplastic material along a longitudinal axis, through an extrusion opening that lies intermediate of a core and an annularly disposed die opening, and into a tubular layer of thermoplastic material, which method comprises:
  (a) injecting a flow of molten thermoplastic material into a crosshead;
  (b) providing an annular stream of said thermoplastic material that is circumferentially disposed around said longitudinal axis and that is radially spaced apart therefrom by dividing said injected flow of thermoplastic material into two separate streams, flowing one of said streams of said thermoplastic material partially around said longitudinal axis in one direction, and substantially completing encirclement of said longitudinal axis by flowing the other of said streams of said thermoplastic material partially around said longitudinal axis in the other direction;
  (c) feeding said annularly disposed stream of said thermoplastic material into an annularly disposed mixing passage that includes an entry, and that includes an exit having a first cross sectional area;
  (d) mixing said thermoplastic material as said thermoplastic material flows through said mixing passage from said entry to said exit;
  (e) compressively forging said thermoplastic material into a tubular layer of thermoplastic material having a second cross sectional area that is larger than said first cross sectional area; and
  (f) extruding said tubular layer of thermoplastic material through an extrusion opening having a third cross sectional area.

32. A method as claimed in claim 31 in which said second cross sectional area is more than twice as large as said first cross sectional area.

33. A method as claimed in claim 31 in which said forging step comprises increasing said cross sectional area from said first cross sectional area to said second cross sectional area at a rate that instantaneously exceeds 10 cm.$^2$/cm.

34. A method as claimed in claim 31 in which said compressive forging step, and said increase in cross sectional area of said tubular layer of thermoplastic material thereof, comprises providing a circumferential shoulder that is disposed substantially transverse to said longitudinal axis.

35. A method as claimed in claim 31 in which said method further comprises:
  (a) pre-extruding said thermoplastic material into a fourth cross sectional area that is smaller than said second cross sectional area of said compressive forging step subsequent to said compressive forging step and prior to said extruding step; and
  (b) compressively forging said thermoplastic material into a fifth cross sectional area that is greater than said fourth cross sectional area of said pre-extruding step and that is greater than said third cross sectional area of said extrusion opening, subsequent to said pre-extruding step and prior to said extruding step.

36. A method as claimed in claim 35 in which said fourth cross sectional area of said pre-extruding step is less than one-third of said second cross sectional area of the first said compressive forging step.

37. A method as claimed in claim 35 in which said fifth cross sectional area of the second said compressive forging step is more than 50 percent larger than said fourth cross sectional area of said pre-extruding step.

38. A method as claimed in claim 35 in which said fifth cross sectional area of the second said compressive forging step is more than 50 percent larger than said third cross sectional area of said extrusion opening.

39. A method as claimed in claim 31 in which said mixing step comprises dividing said flow of thermoplastic material into a plurality of streams and subsequently merging said divided streams.

40. A method as claimed in claim 31 in which said mixing step comprises dividing said flow of thermoplastic material into a plurality of streams, subdividing said plurality of streams, and merging adjacent ones of said subdivided streams.

41. A method as claimed in claim 31 in which said mixing step comprises said thermoplastic material flowing longitudinally from said entry to said exit of said mixing passage.

42. A method as claimed in claim 31 in which said method comprises a choking step being interposed intermediate of said feeding step and said mixing step, wherein flow of said thermoplastic material is restricted by flowing through an annular restriction area having a sixth cross sectional area that is less than three-fourths of said first cross sectional area of said mixing passage.

43. A method as claimed in claim 31 in which said compressive forging step, and said increase in cross sectional area of said tubular layer of thermoplastic material thereof, comprises providing a circumferential shoulder that is disposed substantially transverse to said longitudinal axis;
  said mixing step comprises dividing said flow of thermoplastic material into a plurality of streams, subdividing said plurality of streams, and merging adjacent ones of said subdivided streams.

44. A method as claimed in claim 43 in which said method further comprises:
  (a) pre-extruding said thermoplastic material into a fourth cross sectional area that is less than one-third of said second cross sectional area of said compressive forging step subsequent to said compressive forging step and prior to said extruding step; and
  (b) compressively forging said thermoplastic material into a fifth cross sectional area that is more than 50 percent larger than said fourth cross sectional area of said pre-extruding step, and that is more than 50 percent larger than said third cross sectional area of said extrusion opening, subsequent to said pre-extruding step and prior to said extruding step.

45. A method as claimed in claim 44 in which said mixing step comprises said thermoplastic material flowing longitudinally from said entry to said exit of said mixing passage; and
  said method further comprises a choking step being interposed intermediate of said feeding step and said mixing step, wherein flow of said thermoplastic material is restricted by flowing through an annular restriction having a sixth cross sectional area that is less than three-fourths of said first cross sectional area of said mixing passage.

* * * * *